United States Patent [19]
Asrar et al.

[11] Patent Number: 6,025,028
[45] Date of Patent: Feb. 15, 2000

[54] POLYHYDROXYALKANOATE COATINGS

[75] Inventors: Jawed Asrar, Chesterfield, Mo.; Jean R. Pierre, St-Denis; Pol D'Haene, Kessel-Lo, both of Belgium

[73] Assignee: Monsanto Company, St. Louis, Mo.

[21] Appl. No.: 09/122,428

[22] Filed: Jul. 24, 1998

Related U.S. Application Data

[60] Provisional application No. 60/053,724, Jul. 25, 1997.

[51] Int. Cl.⁷ ...................................................... B05D 1/26
[52] U.S. Cl. .................. 427/358; 427/385.5; 428/537.1; 428/537.5
[58] Field of Search ................................ 427/385.5, 358; 428/537.1, 537.5

[56] References Cited

U.S. PATENT DOCUMENTS

| | | | |
|---|---|---|---|
| 4,826,493 | 5/1989 | Martini et al. | 604/327 |
| 4,880,592 | 11/1989 | Martini et al. | 264/514 |
| 5,061,743 | 10/1991 | Herring et al. | 524/130 |
| 5,076,983 | 12/1991 | Loomis et al. | 264/101 |
| 5,231,148 | 7/1993 | Kleinke et al. | 525/450 |
| 5,382,652 | 1/1995 | Fukuda et al. | 528/308 |
| 5,502,158 | 3/1996 | Sinclair et al. | 528/354 |
| 5,534,616 | 7/1996 | Waddington | 528/503 |
| 5,574,129 | 11/1996 | Miyoshi et al. | 528/354 |
| 5,578,382 | 11/1996 | Waddington | 428/480 |
| 5,618,855 | 4/1997 | Noda | 521/189 |

FOREIGN PATENT DOCUMENTS

| | | |
|---|---|---|
| 2161059 | 10/1995 | Canada . |
| 736563 | 10/1996 | European Pat. Off. . |
| 9-132701 | 5/1997 | Japan . |
| 92/04412 | 3/1992 | WIPO . |
| 94/06856 | 3/1994 | WIPO . |
| 95/17454 | 6/1995 | WIPO . |
| 97/22634 | 6/1997 | WIPO . |

*Primary Examiner*—Erma Cameron
*Attorney, Agent, or Firm*—Jon Beusen; Arnold White & Durkee

[57] ABSTRACT

Methods of making PHA coating compositions having molecular weights greater than about 125,000 are provided. The PHA coating compositions derived therefrom have improved properties suitable for applications in which excellent heat sealability and moisture resistance is desired.

17 Claims, 4 Drawing Sheets

POLYHYDROXYALKANOATE COATINGS

This application is based on United States Provisional Application No. 60/053,724, filed Jul. 25, 1997.

FIELD OF THE INVENTION

The present invention relates generally to the fields of biodegradable polymers. More particularly, it concerns methods for the production of polyhydroxyalkanoate (PHA) coatings having excellent heat sealing properties and moisture resistance.

BACKGROUND OF THE INVENTION

There has been considerable interest in recent years in the use of biodegradable polymers to address concerns over plastic waste accumulation. The potential worldwide market for biodegradable polymers is enormous (>10 B lbs/yr.). Some of the markets and applications most amenable to the use of such biopolymers involve those having single, short use applications, including packaging, personal hygiene, garbage bags, and others. These applications, although poorly suited for recycling, are ideally suited for biodegradation through composting.

PHA biopolymers are thermoplastic polyesters produced by numerous microorganisms in response to nutrient limitation. The commercial potential for PHA spans many industries, and is derived primarily from certain advantageous properties which distinguish PHA polymers from petrochemical-derived polymers, namely excellent biodegradability and natural renewability.

Widespread use and acceptance of PHA, however, has been somewhat hindered by certain undesirable chemical and physical properties of these polymers. For example, PHA is perhaps the most thermosensitive of all commercially available polymers. As such, a dramatic rate of polymer degradation is observed at the temperatures typically required for conventional processing of PHA into end-products such as films, coating, fibers etc. An additional limitation of the potential utility of PHA polymers relates to the observation that some characteristics of the polymer (for example, ductility and permeability) diminish over time. This rapid "aging" of certain PHA-derived products is unacceptable for many applications. Thus, the success of PHA as a viable alternative to both petrochemical-derived polymers and to non-PHA biodegradable polymers, will depend upon novel approaches to overcome the unique difficulties associated with PHA polymers and with products derived therefrom.

One important application of biodegradable polymers is in the area of paper coating for packaging and one time use applications. In many applications, coated papers need to be heat sealed. The adhesive strength of the heat sealed material and its stability under different conditions is critical. However, prior to the present disclosure, the production of PHA coating materials having acceptable heat sealability had not been addressed.

WO 94/16000 discloses a process for preparing a film (or coating) of PHA comprising applying a layer of molten PHA to a surface not substantially above the Tg of the PHA to form a film and subsequently raising the temperature to Tc, the optimum temperature for crystallization, to produce a non-sticky film (or coating). In one example, a PHBV (10% valerate) containing 1 phr boron nitride (BN) at 180° C. was extrusion coated onto paper at a line speed of 60 m/min with the chill roll at 4° C., then passed through an IR-heated zone at 80° C. to crystallize the PHA as a 10 micron thick coating, and then wound onto a roll.

WO 95/15260 discloses a process for making biodegradable film containing at least one layer comprising cellulose and at least one layer comprising PHA, with heating to cause adherence between layers. The PHA is applied as a solution or aqueous suspension or latex. The reference also discloses a process of laying PHA sides of two films together and heat sealing them.

WO 95/17454 discloses a process for preparing extruded PHA films and coatings by applying a molten layer of the composition to a surface which is at a temperature in the range from 20° C. above to 20° C. below the optimum crystallization temperature of the polymer. The process is disclosed as being suitable for producing PHA films at higher line speeds than previously possible in a single stage process.

Lacking from the prior art, however, are methods of producing PHA coatings having sufficient heat sealing properties as required for forming shaped articles such as cups and other containers where heat sealability is important. The present invention has identified unexpected molecular weight requirements of PHA in coating compositions that are required in order to achieve acceptable heat sealing, and the means by which to arrive at the coatings.

SUMMARY OF THE INVENTION

The present invention broadly concerns methods of making biodegradable coating compositions, and objects/articles coated with the compositions. The coatings of the present invention comprise biodegradable PHA polymers. These coatings exhibit improved properties suitable for use in any coating application where heat sealing strength is important, for example with coated board and paper.

In accordance with one aspect of the invention, there is provided a method for producing a coating on objects, wherein the coating comprises PHA having a molecular weight greater than about 125,000 daltons, more preferably greater than about 150,000 daltons. The method comprises melting and extruding coatings onto objects under effective conditions of initial PHA molecular weight, melt temperature and residence time at melt temperatures for producing coatings on objects within the desired molecular weight range.

In accordance with a further aspect of the present invention, there is provided such a method by providing PHA pellets wherein the molecular weight of the PHA in said pellets is essentially in the range of 200,000 to 400,000, preferably 250,000 to 350,000, melting the PHA pellets, and extrusion coating the melted PHA to an object to be coated. Preferably, the PHA in coatings so produced has molecular weights greater than about 125,000, more preferably greater than about 150,000. The seal strength typical of the PHA-derived coatings of the present invention, as measured using a hot tack test, is greater than 1 N, preferably greater than 3 N, and more preferably greater than 5 N.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DESCRIPTION OF ILLUSTRATIVE EMBODIMENTS

Any synthetic or biologically produced PHA is suitable for use in the present invention. PHAs are biodegradable polymers or copolymers having the following general structure for one or more of the repeating units:

where a is 0 to 6, b is 0 to 15, Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc., and n is an integer. The pendant groups of the repeating units may contain additional functionalization such as double bonds, epoxidized double bonds, hydroxyl groups, alkyl groups, alkenyl groups etc. or combinations thereof. The polymer main chain can contain up to 8 carbons in the repeating units and there may be additional functionalization in or on the main chain such as double bonds, alkyl groups, alkenyl groups, hydroxyl groups etc. or combinations thereof.

The PHA is preferably one capable of being biologically produced, for example in a plant or microbial organism. Most typically, it is a fermentation product, particularly of a microbiological process, whereby a microorganism lays down polyhydroxyalkanoate during normal or manipulated growth. Manipulation may be achieved by removing or failing to produce one or more nutrients necessary for cell multiplication. Numerous microbiological species are known in the art to be suitable for the production of polyhydroxyalkanoate polymers (see for example, Anderson and Dawes, Micro. Rev. 54 (4): 450–472, 1990). The microorganisms may be wild type or mutated or may have the necessary genetic material introduced into it, for example by any of the methods or recombinant DNA technology. It is to be emphasized that it is not necessary for the PHA-producing organism to be a microorganism, but at present such organisms are preferred.

The PHAs preferably have as constituents hydroxyalkanoates (HA) monomers which are substrates for PHA synthase enzymes. Biologically-produced PHA polymers are the product of PHA synthase microbial enzymes, and are produced in either a bacterial cell which naturally contains a PHA synthase, or in a bacterial or other cell type, for example a plant cell, which has been genetically engineered to express such an enzyme. The microbial PHA synthase enzymes have broad substrate ranges and are capable of incorporating a large number of HA monomers as constituents of biosynthetic PHA depending upon growth conditions, precursor substrate availability, and the source of the PHA synthase enzyme. The diversity in composition of biosynthetic PHA polymers is underscored by the fact that at least 91 HA monomers have been identified as substrates for PHA synthases (Steinbuchel, A. and Valentin, H. FEMS Micro.Letters 128 (1995) 219–228).

Suitable HA monomers can include those having the following formula:

where a is 0 to 6, b is 0 to 15 and Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc. As in the above description, there may be additional functionalization in or on the pendant and/or main chains. The monomers can be homopolymerized or copolymerized either biochemically or synthetically to produce the polymer.

Preferred HAs monomers include those where a=1–4, b=0–15, and Y is H. More preferably, the monomers are those where a=1–2 and b=0–3, and Y is H.

In a most preferred polymer, the PHA is of formula (I) where a is 1, b is 1 or 2 and Y is H and especially where there are units with b=1 and b=2 copolymerized together. Suitable polyesters contain a preponderance of b=1, especially with at least 70 mol % of such units, the balance being units in which b=2. Polymer containing a=1, b=1, Y=H as the only units is polyhydroxybutyrate (PHB) polyester while that containing additionally b=2 is polyhydroxy-butyrate-co-valerate (PHBV).

The polymer can also be a blend of two or more PHAs differing in the value of m. A particular example contains:

a) polymer consisting essentially of Formula I units in which 2–5 mol % of units have a=1, b=2 and Y=H, the rest a=1, b=1, and Y=H, and b) polymer consisting essentially of Formula I units in which 5–30 mol % of units have a=1, b=2 and Y=H, the rest a=1, b=1, and Y=H.

The proportions of the polymer in such a blend is preferably such as to give an average a=1, b=2 and Y=H content in the range 2 to 28 mol % and typically 4 to 18 mol %. Thus, in a most preferred form the polymer is a poly (hydroxybutyrate/valerate) copolymer or blend of copolymers.

The present invention relates to the production of PHA-derived coating compositions for use in a variety of packaging and other one-time use applications. The coating compositions provided herein and made in accordance with the present invention display improved heat sealing properties made possible only by the unexpected finding that certain polymer molecular weight characteristics are necessary in order to achieve the desired coating properties.

As used herein, the term "molecular weight", unless otherwise specified, refers to the weight average molecular weight (Mw) as opposed to the number average molecular weight (Mn). Most synthetic polymers have a broad distribution of molecular weights, and the molecular weights reported for such polymers represent averages, most frequently defined by Mw or Mn according to the following formulas:

$$M_w = \sum_i n_i M_i^2 \bigg/ \sum_i n_i M_i$$

$$M_n = \sum_i n_i M_i \bigg/ \sum_i n_i$$

where $n_i$=the number of molecules of molecular weight $M_i$. The most commonly used technique for determining Mw and Mn is by gel permeation chromatography (GPC). This method is capable of determining the entire molecular weight distribution of a polymer sample from which molecular weight averages can be determined. Other methods known in the art for determining Mw and Mn include osmometry, scattering and sedimentation (See for example, W. R. Sorensen & T. W. Campbell: Preparative Methods of Polymer Chemistry, Interscience Publishers, New York, 1961)

Figure 1:
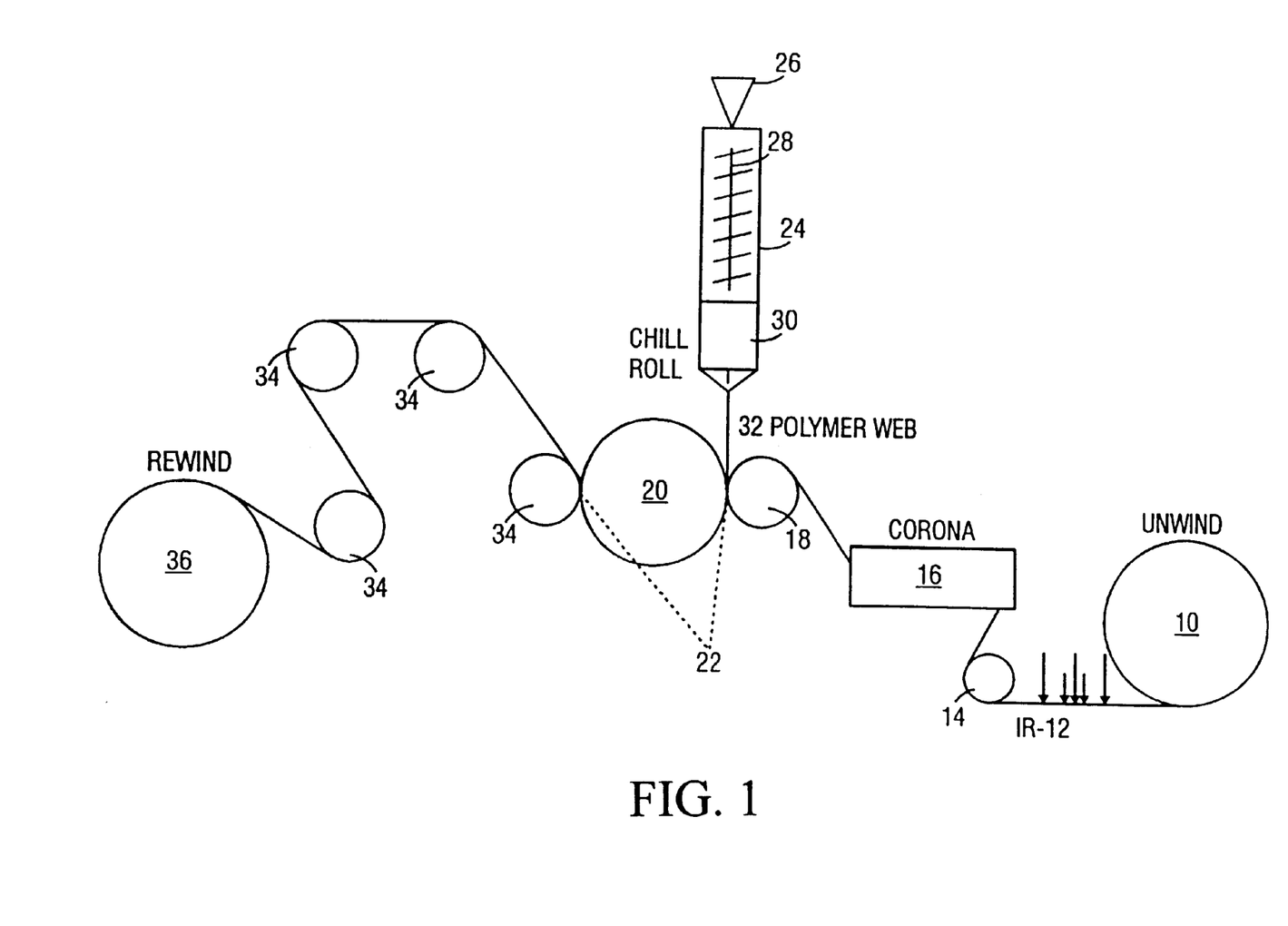
FIG. 1 illustrates a melt-coating process for coating paper with PHA.

FIG. 1 illustrates a melt-coating process for coating paper or paperboard with PHA in which uncoated paper or board unwinding from reel 10 is dried by infrared heater 12 and passed via roller 14 to a Corona treatment facility 16 for oxidizing and preparing functional groups on the paper that facilitates coating and adhesion of the resulting coat.

Melt-extruder 24 may have a hopper 26 by which a feedstock, typically of PHA pellets, is introduced into extruder 24 and processed by heated screw 28 which melts the PHA, for example to a temperature in the range of 160–210° C. and causes the melted PHA to be extruded via die 30 in the form of a polymer web 32.

Polymer web 32 and paper from facility 16 are passed between roller 18, chill roller 20 maintained at a temperature less than that in extruder 24, and roller 34 which together form a cooling and contacting zone 22 under conditions of temperature, pressure and contact time in the zone for producing coated paper of desired characteristics. The coated paper is further air cooled by passing over rollers 34 and wound onto take-up reel 36.

The equipment shown in FIG. 1 is but one representation of an extrusion coating operation. Other equivalent equipment for paper coating is well known to those of ordinary skill in the art and is also suitable for use in accordance with this invention.

In one embodiment of the present invention, there are provided PHA coatings, for example the PHA coating on paperboard on take up reel 36 of FIG. 1. According to the invention, the molecular weight of the PHA in the coatings should be greater than about 125,000, preferably greater than about 150,000. As demonstrated herein, these molecular weights are critical in order to achieve the desired heat sealing properties. The seal strength of a polymer/board contact, where the polymer is a PHA coating and the board is of a quality ranging between 100 g/m$^2$ to 300 g/m$^2$, typically between 200 and 250 g/m$^2$, was unacceptably low when the molecular weight of PHA after coating was less than about 125,000. However, a transition was observed in this molecular weight range, above which there was a distinct and unexpected increase in the seal strength of the coatings (see FIG. 2).

The seal strength of the coating compositions obtainable by the present invention is greater than 1 N, preferably greater than 3 N, and more preferably greater than 5 N. These values apply for the following conditions used during the hot tack measurements: seal temperature of 130–140° C., seal pressure of 200 KPa, cooling time of 0.3–1.5 sec., seal of board (210 g/m$^2$) against board (210 g/m$^2$). It would be recognized by the skilled individual that altering these conditions could result in absolute values which differ from the minimum and preferred seal strengths disclosed herein, but which are within the scope of the present invention.

The improved heat seal strength of the present coatings is desirable for applications where good sealing properties are required, such as paper and paperboard applications including cups, tubs, paper waste bags and comparable packaging products. Moreover the improved seal strength allows higher line speeds in the heat sealing operations and can increase yield.

In evaluating suitable parameters for producing PHA-derived coatings, it was observed that no direct relationship existed between the molecular weight of the PHA pellets used as starting material to produce PHA coatings and the resulting molecular weight of PHA in the final coating composition. Unexpectedly, an inverse relationship was observed instead. It was found that the higher the molecular weight of PHA granules/pellets used as a starting material, the lower the molecular weight of PHA in the final coating (see FIG. 3).

These results clearly differ from what would be expected with other polymers, for example polyolefins. With a polymer such as polyethylene, if different polymer batches having increasing molecular weights were extruded to produce coatings, the resulting coatings would have correspondingly increasing molecular weights. Thus, there is a direct relationship between the molecular weight of the original polymer and the molecular weight of the polymer after coating. For PHA, in contrast, under processing conditions typically required for extrusion melt coating, the molecular weight after coating can be inversely related to the molecular weight of the PHA polymer in the pellet.

Using data representative of the degradation of a PHBV (polyhydoxybutyrate-co-valerate) copolymer as a function of molecular weight over a plurality of discrete temperatures, we have generated and calibrated a model for predicting the effects of some of the production variables in a melt coating process on final coating molecular weights. It has been found that several of the conditions characterizing use of a screw driven melt extruder such as extruder 24 in FIG. 1, including molecular weight of PHA in the PHA feedstock, residence time in the extruder, and the melt temperature in the extruder can all affect the molecular weight of the resulting PHA coat. Thus, it has been found that changes in the molecular weight of the pellets in a PHA feedstock will affect the necessary residence time of the material in the extruder at a fixed melt temperature, and will also affect the melt temperature at a fixed residence time. These results are shown in the following table in which the first column gives the original molecular weight of the PHA pellets, the second column gives the residence time at a fixed melt temperature of 200° C. to obtain a coating with a final molecular weight of 150,000 daltons, and the third column shows the melt temperature required at a fixed residence time of 300 seconds to obtain a coating with a final molecular weight of 150,000 daltons

| PHA Pellets Mw | Residence Time[a] | Temp[b] |
| --- | --- | --- |
| 250,000 | 240 | 200 |
| 350,000 | 302 | 203 |
| 450,000 | 358 | 206 |

-continued

| PHA Pellets Mw | Residence Time[a] | Temp[b] |
|---|---|---|
| 600,000 | 411 | 208 |
| 750,000 | 440 | 210 |

[a] Seconds @ 200 deg. C. melt temperature
[b] Deg. C. @ 300 seconds residence time

These results show that a selection of initial molecular weight in the PHA pellets, melt temperature, and residence time must be appropriately selected so as to achieve a desired molecular weight range in the coating. A person skilled in the art of melt coating will recognize from this description that at higher molecular weights, control of an extruder such as extruder 24 in FIG. 1 will become difficult due to excessive shear heating due to the high viscosity of PHA melt resulting from high molecular weight pellets.

In general, however, it will be apparent that the person skilled in the art, based on the description herein, can readily determine experimentally the conditions of initial PHA molecular weight, melt temperature, and residence time necessary to obtain coatings having the desired molecular weight of above 125,000 daltons, preferably above 150,000 daltons. For example, starting with higher molecular weight PHA will require higher melt temperatures or longer residence times, hence lower line speeds, to obtain a desired molecular weight providing sufficient adhesion of the PHA to the paper or paperboard but high enough to provide sufficient heat sealing. As indicated above, when using higher initial molecular weight materials, control of equipment such as extruder 24 will be more difficult due to the excessive shear heating during melting and extrusion. As such, the initial molecular weight range of the PHA feedstock materials is preferably in the range of 200,000 to 400,000 although higher initial PHA molecular weight materials can also be used in accordance with the invention by changing the melt temperature and residence time.

Further in accordance with the invention, a range of preferred conditions suitable for production of PHA-derived coatings having desirable heat sealing properties are disclosed. Therefore, in a further embodiment of the present invention, there is provided a method of producing a coated object wherein the coating comprises PHA, and wherein the coating exhibits properties suitable for applications where good heat seal strength is desired. In order to arrive at a PHA coating compositions having these properties, it has been found that the molecular weight of the PHA pellets should be between about 200,000 and 400,000, preferably between about 250,000 and 350,000, under the processing conditions disclosed. The use of PHA pellets having molecular weights outside of the 200,000–400,000 range typically results in a PHA molecular weight after coating of less than 125,000. As demonstrated herein, such coatings have unacceptable properties such as a poor cohesive strength of the coating itself and of the polymeric seal.

A variety of nucleants are suitable for use in the present coatings. These could include, for example boron nitride (EP-A-0291024), organic phosphonic acid based systems such as the cyclohexylphosphonic acid/zinc-stearate system (U.S. Pat. No. 5,061,743), and other nucleant systems known in the art.

A preferred nucleant is one having the following structure:

where R can be hydroxy, hydrogen, C1–C25 alkyl groups (with or without one or more substituent groups such as —OH, —CO2H, —Cl, —Br, —NH2, —N(alkyl)H or N(alkyl)2), cycloalkyl groups, aryl or arylalkyl groups (such as phenyl, benzyl, etc. with or without substituents on the aromatic rings). Synthesis of such compounds can be achieved, for example, by reaction of organocarboxylic acids, PC13 in an aqueous medium. The compounds and their syntheses have been described in the prior art for use as water treating chemicals, detergent ingredients, etc. (for example see U.S. Pat. Nos. 3,855,284, 3,400,147, 3,400,150, 4,254,063, Aus. 599,950, FR 1,521,961 and CA 93:182031). The synthesis can also be applied to dibasic acids such as adipic acid, succinic acid, etc. to give the corresponding tetrakis phosphonic acids (i.e., di-ODPAs) which can also be used as nucleants. For example, with adipic acid, 1,6-dihydroxy-1,6-dihexanediylidene tetraphosphonic acid is obtained (Aus. 599950). Other compounds that can be used as nucleants include methylene diphosphonic acid (PL 131549) and carbonyl diphosphonic acid (CA 93:182031). Such compounds are herein sometimes referred to as organodiphosphonic acids or ODPAs, which is term intended to include both ODPAs and di-ODPAs. The ODPAs or di-ODPAs may also be formed in situ, for example by reaction of the corresponding phosphinic acid.

Preferred ODPAs include 1-hydroxy-lower alkylidene-1, 1-diphosphonic acids such as 1-hydroxyethylidene-1,1-diphosphonic acid (HEDP),1-hydroxypropylidene-1,1-diphosphonic acid,1-hydroxybutylidene-1,1-phosphonic acid,1-hydroxycyclohexylidene-1,1-diphosphonic acid. In a most preferred nucleant, both acid moieties are phosphonic acid moieties, R1 is a methyl group and R2 is hydroxy group (i.e., HEDP). HEDP is available as a mixture of HEDP in water from Monsanto Company (800 N. Lindbergh, St. Louis, Mo. 63167) under the tradename DEQUEST 2010. The ODPA is used in amounts typically in the range of 0.01–5.0 phr (parts per hundred resin), preferably about 0.02–1.0 phr, most preferably about 0.02–0.5 phr.

The nucleants can further be metallic salts of ODPAs, preferably mono-metallic salts. However, it is generally preferred that not all, e.g., less than 70%, more preferably less than 60% of the phosphonic acid moieties are involved in the salt formation since it has been found that excessive salt formation may adversely influence the effectiveness of certain nucleants of the invention.

Organic metal salts and/or certain inorganic compounds can be used to further improve nucleation activity and/or reduce the extent of discoloration and/or improve the clarity of PHA-derived products when used in combination with the ODPAs of the invention. The organic metal salt is preferably an organic acid salt, more preferably a fatty acid metal salt. The inorganic compound is preferably an metal oxide, a metal hydroxide or a metal carbonate. Suitable metals include those selected from Groups I to V of the periodic table, preferably aluminum, antimony, tin, sodium, calcium, magnesium, barium or zinc. Most preferably the metal is one which has benign environmental and toxicological properties such as magnesium, calcium and barium. Preferred fatty acids include stearic acid, palmitic acid, acetic acid, propionic acid, caproic acid, oleic acid, behenic acid and montanic acid. Most preferably, the fatty acid metal salt of the invention is calcium stearate or magnesium stearate which have proven highly effective in combination with ODPAs in nucleating thermoplastic polyesters. The organic metal salt or the inorganic metal oxide, metal hydroxide or metal carbonate is used in an amount typically ranging from 0.001 to 5 phr (parts per hundred of resin), preferably about 0.005 to 2 phr, and most preferably about 0.01 to 0.5 phr.

A nucleant formulation preferably comprises organic metal salt (or inorganic metal oxide, metal hydroxide or metal carbonate) and ODPA in weight ratios of about 0.01:1 to 10:1, preferably about 0.05:1 to 7.5:1, and more preferably about 0.1:1 to 5:1. When calcium stearate is used in a preferred nucleant formulation, a 3:1 ratio has been found to provide a suitable solid support for the ODPA-solvent solution and to produce a PHA nucleant with desirable activity.

The weak organic base is one which is effective in improving the elongational properties and/or clarity of the polymeric material. The weak organic base should be polymer-miscible or—soluble and melt at a sufficiently high temperature so that, if desired, nucleating agent solvent can be readily removed during preparation. The weak organic base preferably comprises a mono-, bis-, or tri- fatty acid amide, as these generally exhibit good hydrolytic stability in the presence of ODPAs. More preferably, the weak organic base is a stearamide, for example ethylene bistearamide (EBS), available from Lonza or Henkel under the tradename Acrawax C or Loxamid EBS. The weak organic base is typically present in the polymeric compositions in an amount between about 0.01 to 9.0 phr, preferably between about 0.05 to 1.0 phr, most preferably about 0.1 to 0.5 phr.

Thus, a most preferred nucleant for use in this invention comprises HEDP/calcium stearate/EBS present in ratios effective for nucleating PHA and producing PHA articles having excellent clarity, color, elongational and tensile properties. Most preferably, the constituents of this formulation are present in weight ratios of about 0.8/1.5/1.7 respectively.

Suitable levels of such a nucleant formulation to be added to the PHA range from about 0.01 to 5.0 parts per hundred of resin (phr). Preferably, the level of the nucleant formulation is about 0.05–1.0 phr, and most preferably it is about 0.1–0.6 phr.

It is advantageous when preparing the nucleant to dissolve/suspend the ODPA, and optionally the organic metal salt (or inorganic metal oxide, metal hydroxide or metal carbonate) and/or the weak organic base, in an effective nucleating agent solvent. Preferably, the solvent is then removed, for example by evaporation under vacuum, giving rise to solids which are ground, pulverized, or otherwise treated so as to produce particles with diameters less than about 710 microns, preferably less than about 350 microns. The term "effective nucleating agent solvent" herein means a solvent which dissolves the ODPA and preferably enhances its nucleation activity but which does not intolerably reduce its effectiveness as a nucleant. Thus, the ODPA prepared using an effective nucleating agent solvent as described herein will have at least as effective nucleation activity, preferably greater nucleation activity, compared to the same ODPA that is not dissolved in an effective nucleating agent solvent during its preparation or use.

Nucleating agent solvents for use in this invention include but are not limited to C1 to C6 aliphatic mono, di- and tri- ols such as methanol, ethanol, ethylene glycol, 1- or 2-propanol, propylene glycol, glycerol, 2-methyl-2- propanol, 2-butanol and the like, and further including mixtures of such solvents with each other and with water. Preferred nucleating agent solvents include methanol, ethanol or another lower alcohols, or mixtures of such alcohols with water to allow for easy solvent removal. The nucleating agent solvent needs to be appropriately selected since it has been found that some solvents such as acetone and tetrahydrofuran when used with some ODPAs such as HEDP are not effective nucleating agent solvents. However, it is known that mixtures of solvents, e.g. methanol and acetone, can serve as effective nucleating agent solvents as defined herein even though one of the solvents in the mixture is not an effective nucleating agent solvent when used alone. While all of the solvents which will be effective nucleating agent solvents has not yet been elucidated, a person skilled in the art can readily determine whether a proposed solvent for an ODPA is "effective" by routine experimentation following the description herein.

The method by which a coating of the present invention is prepared and applied to an object/article to be coated involves the steps of melting the polymer material, typically in a single screw extruder 24 as illustrated in FIG. 1, extruding the polymer through a T-shaped or a coathanger die 30, and applying the polymer web to the paper sheet surface. This polymer-paper laminate is generally supported by a cooling roll which is at a temperature between about 50 and 60° C. Finally the laminate is transferred to a winding installation which is producing rolls of coated board or paper.

Figure 4:
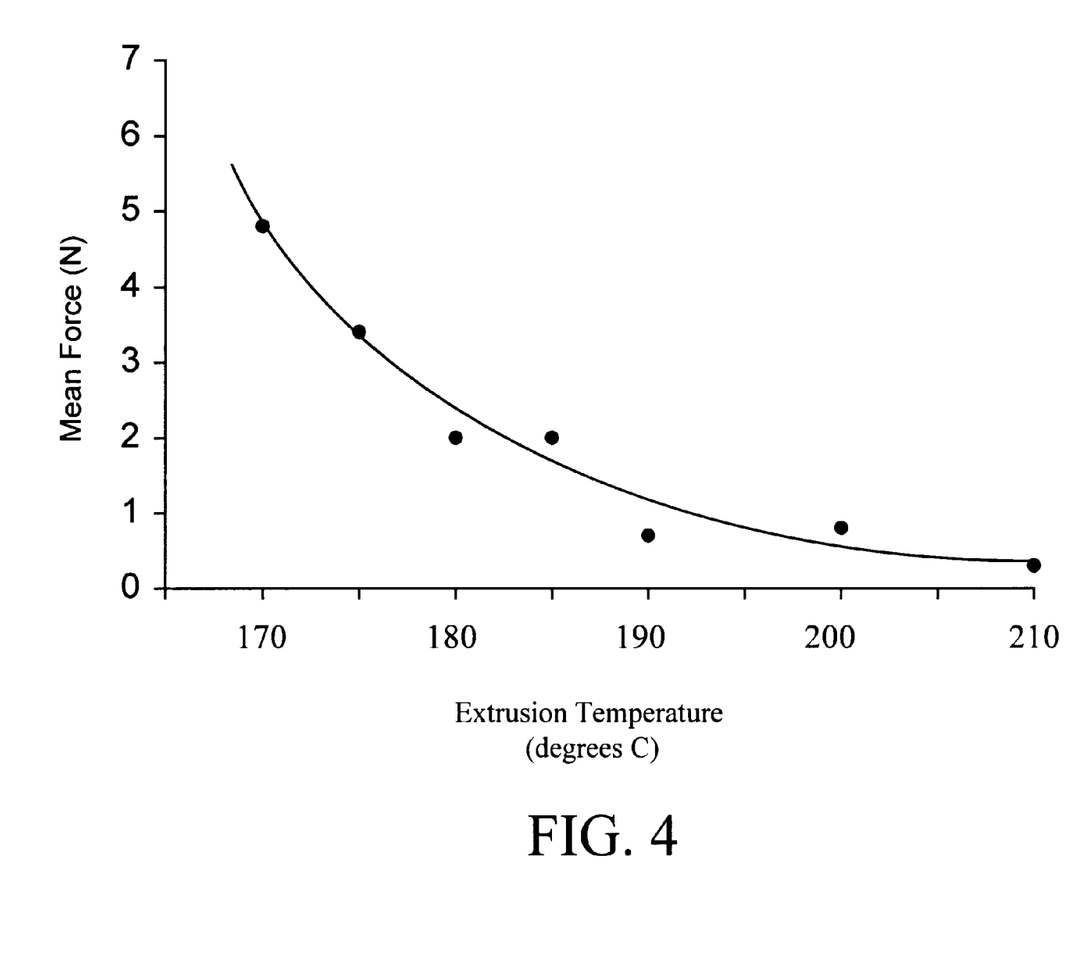
FIG. 4 demonstrates the effect that the extrusion temperature used in producing PHA-coated paper has on hot tack measurements.

Extrusion temperature can be an important consideration when producing coatings according to the present invention due to its influence on coating seal strength (see FIG. 4). An excessively high temperature will produce too much polymer degradation resulting in an undesirably low molecular weight of the polymeric coating, and therefore inferior heat sealing properties. The rate of degradation of the PHA depends on the temperature of the melt and increases sharply with increasing temperature. A low temperature, on the other hand, can result in unacceptably high viscosity and poor adhesion of the polymer to the surface. Thus, the temperature of extrusion can be manipulated in order to effect the molecular weight of the PHA after coating. Typical barrel temperatures during extrusion are between about 160 and 210° C. Preferably, they are between about 170 and 190° C.

The extruder screw speed (see screw 28 in FIG.1) can also influence coating properties and therefore should be chosen accordingly. High screw speed can result in excessive shear heating which results in an increase in the melt temperature. A low screw speed can increase the residence time of the product in the extruder which results in enhanced polymer degradation. In accordance with the present invention, screw speeds of around 60 rpm have been found most suitable when using an extruder having a 4.5" inside diameter and a length-to-diameter ratio L/D=25. Such characteristics can readily be made for other equipments by a person skilled in the melt-coating arts.

In accordance with the method described above, there are a variety of applications for which the PHA-derived coatings of the present invention would be useful. Numerous objects/articles could benefit from such coatings. Preferred objects suitable for coating according to the present invention include those in which excellent heat sealing properties would be desirable, including cups, paper, paper waste bags, etc. The increased seal strength of the coatings also allows for higher line speeds in the sealing operation, a wider operating window and an increased production yield.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute examples of preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Three different batches of PHA having different molecular weights were coated on board, using the same extruder conditions in all three cases. Thus, the same temperature settings (175° C.) and screw speeds (56 rpm) were used. Molecular weights (Mw and Mn) in this and all experiments were determined by GPC using standard monodisperse polystyrene calibrants in a molecular weight range from 5000 to 2,250,000. The following observations were made:

| Pellets MW/Mn | Coatings MW/Mn | Temperature of the melt (° C.) |
|---|---|---|
| 312 k/147 k | 128 k/76 k | 199 |
| 270 k/133 k | 162 k/89 k | 195 |
| 256 k/127 k | 166 k/91 k | 193 |

Figure 3:
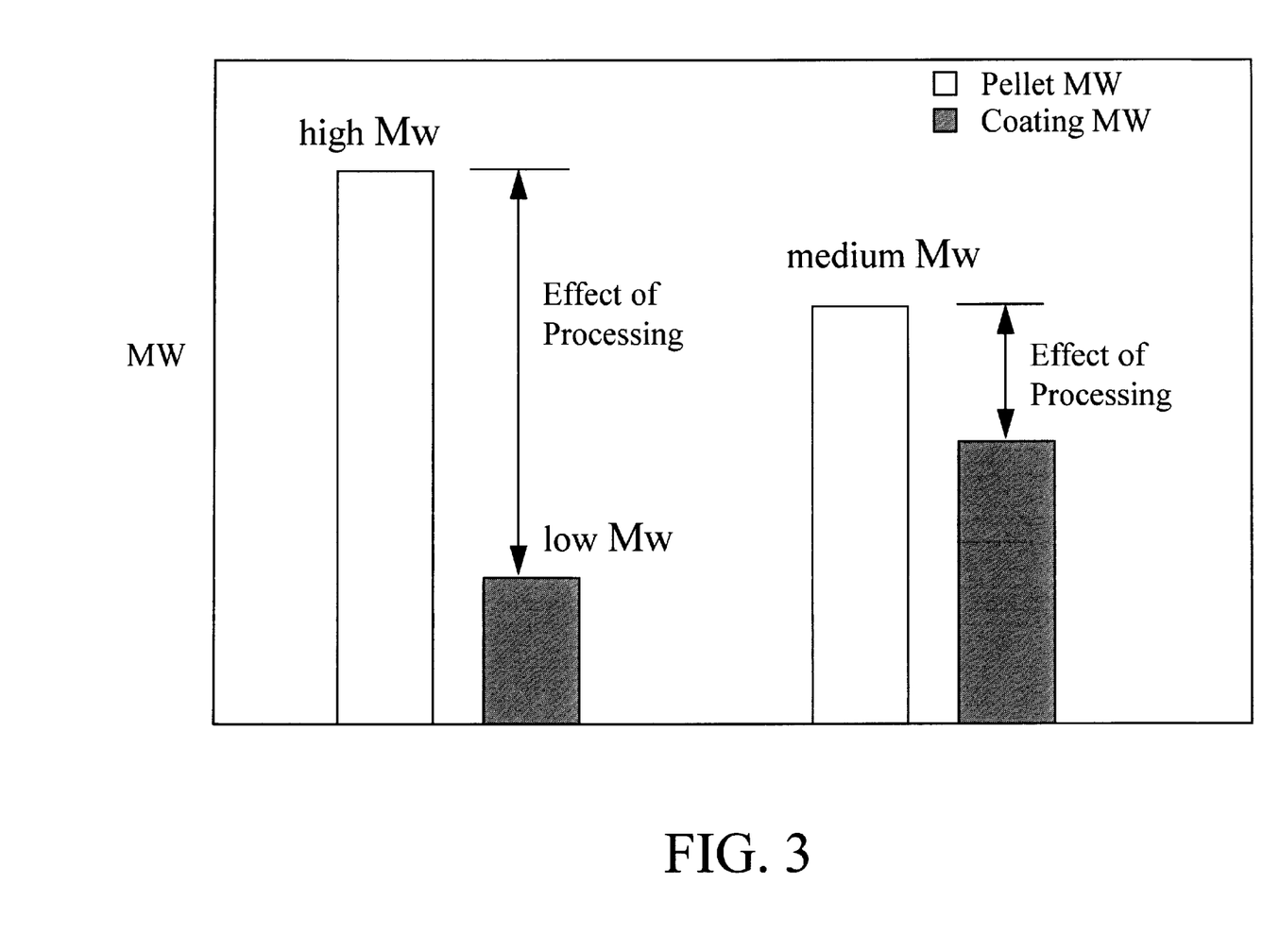
FIG. 3 depicts the relationship between the molecular weight of PHA in the pellets used to produce coatings and the molecular weight of the PHA after coating. It has been observed that the higher the molecular weight of the PHA in the pellets, the greater the degradative effects of processing, resulting in lower molecular weights of PHA in the resulting coating compositions.

Unexpectedly, the higher the molecular weight of the PHA in the pellets, the lower the PHA molecular weight after coating as shown in FIG. 3. The temperature of the melt was increased according to the molecular weight of the original pellets. Higher molecular weights may have resulted in increased shear heating, due to the higher viscosity of the polymer melt, leading to an increased rate of polymer degradation.

Hot tack measurements have also indicated the same order: the hot tack peel strength is comparable for the coatings having molecular weights of 162,000 and 166,000, however the peel strength of the coating having a molecular weight of 128,000 was somewhat lower. The peel strength for these three samples was larger than for another sample which had an original MW of 359,540. Coating this material under the same conditions resulted in a coating MW of 118,000. This material did not give acceptable heat sealing. A good heat sealing, however, was obtained using the three samples described in the above table.

EXAMPLE 2

The effect of coating molecular weight on sealing properties was examined. For testing sealing properties, a hot coffee test was employed in which coffee was poured into coated board cups having different coating molecular weights. The cups were monitored for 10 minutes for any leakage of the coffee through the cup. The absence of leakage spots indicates good heat sealing of the coatings. The following observations were made.

| MW | Mn | MW/Mn | Sealing Properties |
|---|---|---|---|
| 229 k | 122 k | 1.8 | Good |
| 174 k | 103 k | 1.7 | Good |
| 160 k | 93 k | 1.7 | Good |
| 124 k | 75 k | 1.6 | Poor |
| 119 k | 93 k | 1.7 | Poor |

-continued

| MW | Mn | MW/Mn | Sealing Properties |
|---|---|---|---|
| 107 k | 69 k | 1.6 | Poor |
| 103 k | 66 k | 1.6 | Poor |

EXAMPLE 3

Figure 2:
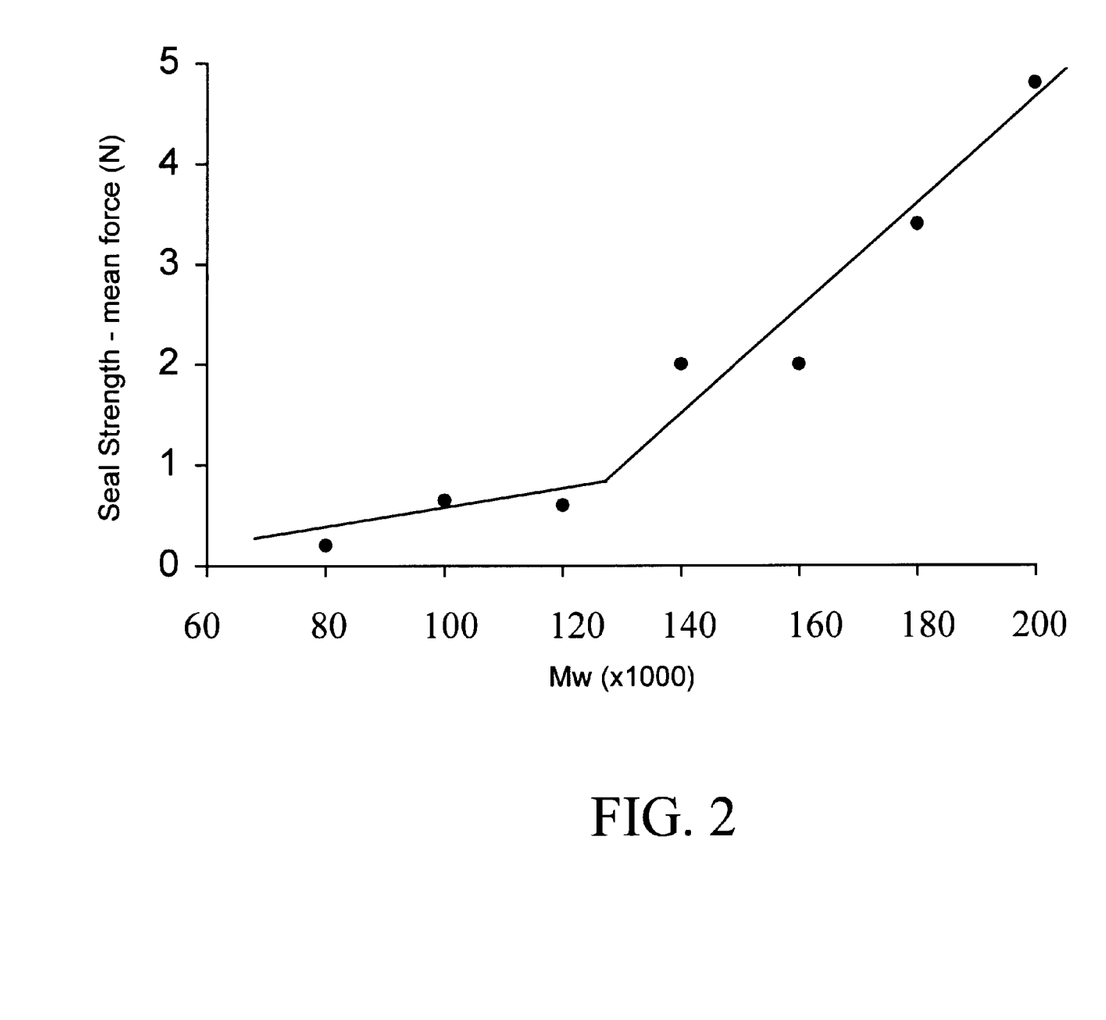
FIG. 2 demonstrates the relationship between the seal strength of PHA-coated paper, as measured using a hot tack test, and the molecular weight of the PHA after coating.

The mean seal strength as a function of the coating molecular weight obtained for these materials, for the polymer/paper contacts, is shown in FIG. 2. For the hot tack measurements the following experimental conditions were used: 200 kPa seal pressure, 0.3 seconds of cooling time and a bar temperature of 130° C. There was a transition observed in the 125,000 MW range above which the seal strength increased rapidly. This transition occurred very close to the critical molecular weight required for obtaining good heat sealability.

The effect of extrusion temperature on hot tack measurement is demonstrated in FIG. 4. In these experiments, PHA was coated on paper using different extrusion temperatures ranging from 170° C. to 210° C. The screw speed remained the same. The molecular weight of the coating decreased exponentially from 210,000 to 80,000 with increasing extrusion temperatures. The hot tack measurements were carried out using the procedure and conditions described above.

EXAMPLE 4

Hot tack measurements were carried out on several samples showing good and poor heat sealability. The heat sealing properties were checked by pouring hot coffee in the cups and checking the occurrence of dark coffee spots on the outside of the cups after 10 minutes. The absence of such spots indicates good heat sealing of the coating. The hot tack measurements were carried out using the following conditions: seal temperature=130° C., seal pressure of 200 kPa, cooling time of 1 sec. The sealing was performed between two boards of 210 g/m². As a reference, hot tack measurements were also carried out on a poly-ethylene coated cup, showing good heat sealing properties. The following observations were made:

| heat sealing properties | seal strength (N) |
|---|---|
| poor | 0.7 |
| good | 6.0 |
| good | 7.7 |
| poor | 0.1 |
| good | 3.6 |
| poor | 0.1 |
| poor | 0.12 |
| good | 7.9 |
| good-polyethylene | 7.6 |

EXAMPLE 5

Hot tack measurements were obtained on PHA-coated board. The seal bar temperature was 138° C. The seal strength is presented as a function of cooling time for a sample that had shown good heat sealing properties and for a sample that had shown poor heat sealing properties. The hot tack measurements were obtained as described in Example 4. The following observations were made:

|  | Sealing Strength (N) | | |
| --- | --- | --- | --- |
| Sample with: | MW after coating | 1.0 sec. cooling | 1.5 sec. cooling |
| Good heat sealing | 174,000 | 4.7 | 6.6 |
| Poor heat sealing | 118,000 | 0.5 | 0.8 |

All of compositions and methods disclosed and claimed herein can be made and executed without undue experimentation in light of the present disclosure. While the compositions and methods of this invention have been described in terms of preferred embodiments, it will be apparent to those of skill in the art that variations may be applied without departing from the concept, spirit and scope of the invention. More specifically, it will be apparent that certain agents which are chemically and/or physiologically related may be substituted for the agents specifically described herein while the same or similar results would be achieved. All such similar substitutes and modifications apparent to those skilled in the art are deemed to be within the spirit, scope and concept of the invention as defined by the appended claims.

What is claimed is:

1. A method of producing a coated object comprising the steps of providing polyhydroxyalkanoate (PHA) having an initial molecular weight, melting the PHA and extrusion coating the melted PHA to an object to be coated wherein the conditions of initial PHA molecular weight, residence time and temperature during melting are effective to produce a coating having a molecular weight of greater than 125,000 daltons.

2. The method of claim 1, wherein the molecular weight of the coating is greater than 150,000.

3. The method of claim 1 wherein the initial molecular weight of the PHA is in the range of about 200,000 to about 400,000.

4. The method of claim 1, wherein initial molecular weight of the PHA is in the range of about 250,000 to about 350,000.

5. The method of claim 1, wherein the coating has a seal strength greater than 1 N.

6. The method of claim 1, wherein the coating has a seal strength greater than 3 N.

7. The method of claim 1, wherein the coating has a seal strength greater than 5 N.

8. The method of claim 1, wherein the PHA further comprises a nucleant.

9. The method of claim 8, wherein the nucleant comprises an organophosphorous compound having at least two phosphonic acid moieties.

10. The method of claim 9, wherein the organophosphorous compound is 1-hydroxyethylidene-1,1-diphosphonic acid.

11. The method of claim 9, wherein the nucleant further comprises a fatty acid salt of a metal from Group I to V of the Periodic Table.

12. The method of claim 9, wherein the nucleant further comprises a weak organic base selected from fatty acid amides.

13. The method of claim 1 wherein the PHA has the formula:

where a=1–6, b=0–15, Y is H, and n is an integer.

14. The method of claim 13 wherein a is 1, b is 1 or 2, Y is H, and n is an integer.

15. The method of claim 1, wherein the coated object is paper or board.

16. A coating produced according to any one of claims 1–15.

17. A coated object produced according to any one of claims 1–15.

* * * * *